(12) United States Patent
Yeh (10) Patent No.: US 8,454,314 B2
(45) Date of Patent: Jun. 4, 2013

(54) SECTIONAL VANE FOR VERTICAL AXIS WIND POWER GENERATOR

(75) Inventor: Dong-Hua Yeh, Taoyuan County (TW)

(73) Assignee: Dong-Hua Yeh, Pingjhen, Taoyuan County (TW)

( * ) Notice: Subject to any disclaimer, the term of this patent is extended or adjusted under 35 U.S.C. 154(b) by 805 days.

(21) Appl. No.: 12/691,748

(22) Filed: Jan. 22, 2010

(65) Prior Publication Data
US 2010/0189565 A1    Jul. 29, 2010

(30) Foreign Application Priority Data

Jan. 23, 2009    (CN) .......................... 2009 1 0008504

(51) Int. Cl.
*F03D 3/06*    (2006.01)
(52) U.S. Cl.
USPC ................. 416/132 B; 416/197 A; 416/219 A
(58) Field of Classification Search
USPC .................. 415/4.2, 4.4, 907; 416/87, 132 B, 416/197 R, 197 A, 197 B, 204 R, 220 A, 416/219 A, 227 R, DIG. 5
See application file for complete search history.

(56) References Cited

FOREIGN PATENT DOCUMENTS
JP    56038575 A  *  4/1981

* cited by examiner

*Primary Examiner* — Richard Edgar
(74) *Attorney, Agent, or Firm* — CKC & Partners Co., Ltd.

(57) ABSTRACT

A sectional vane for vertical axis wind power generator includes a frame unit and a plurality of vane units. The frame unit is fixedly mounted to a main shaft of the wind power generator, and includes an upper frame member and at least one lower frame member. The upper and lower frame members are provided on inner side with an upper and a lower guide rail, respectively. The vane unit includes a vane body having an upper and a lower guide channel provided on a top and a bottom, respectively, corresponding to the upper and the lower guide rail. The vane units are assembled to the frame unit between the upper and the lower frame member through engagement of the guide channels with the guide rails. The sectional vane can be varied in height and area by providing different numbers of lower frame members and vane units.

22 Claims, 10 Drawing Sheets

SECTIONAL VANE FOR VERTICAL AXIS WIND POWER GENERATOR

RELATED APPLICATIONS

This application claims priority to Chinese Application Serial Number 200910008504.7, filed Jan. 23, 2009, which is herein incorporated by reference.

FIELD OF THE INVENTION

The present invention relates to a vane structure, and more particularly to a sectional vane structure for vertical axis wind power generator.

BACKGROUND OF THE INVENTION

Generally, a vertical axis wind power generator utilizes a plurality of vanes to intercept the flow of air currents and according the wind force, so as to drive a main shaft of the wind power generator to rotate for generating electric power. For the purpose of intercepting a large amount of air currents, the vanes of the vertical axis wind power generator usually have a considerably large area and a length as long as 10 to 15 meters. However, it is very troublesome and time-consuming to manufacturing vanes with so large area and length. Also, it is very inconvenient to install and maintain or repair these large vanes.

A vertical axis wind power generator has a vertical main shaft, on which a plurality of vanes are mounted to space from one another along a circumferential surface of the main shaft. Each of the vanes has a front side and a rear side that are generally two corresponding outward curved face and inward curved face, respectively. The inward curved face of the vane is located against the wind to intercept the flow of air currents and accordingly the wind force, so that the vane is push by the wind to thereby drive the main shaft to rotate. Then, the rotating force of the main shaft is transmitted to a plurality of power generator sets for generating electric power.

Since the vanes of the vertical axis wind power generator are sequentially circumferentially spaced around the main shaft, the inward curved rear face of a preceding vane is oriented toward the outward curved front face of a following vane. When the wind blows against the inward curved rear face of one vane, it also blows against the outward curved front face of another diametrically opposite vane. That is, only the wind blowing to the inward curved rear face of the vane is useful to effectively rotate the main shaft, while the wind blowing to the outward curved front face of the vane simply forms a resistance to the rotation of the main shaft.

It is noted the vanes for the conventional vertical axis wind power generator all are a complete plate without any opening formed thereon. When the wind blows to the outward curved front face of the vane, the outward curved front face functions to guide the wind to outer sides of the vane to thereby reduce the air resistance thereto. Nevertheless, the relatively large area of the vane would still block the wind to thereby reduce the overall push produced by the wind against the inward curved rear faces of other vanes. Since the wind force capable of driving the main shaft to rotate is reduced, the effect of wind power generation is disadvantageously reduced accordingly.

SUMMARY OF THE INVENTION

A primary object of the present invention is to provide a sectional vane for vertical axis wind power generator to enable easy manufacturing, assembling, installation and maintenance of the vane.

Another object of the present invention is to provide a sectional vane for vertical axis wind power generator, which, on the one hand, reduces air resistance thereto and, on the other hand, allows effective interception of the wind force for driving the main shaft of the wind power generator to rotate.

To achieve the above and other objects, the present invention provides a plurality of sectional vanes for mounting around and spacing along a main shaft of a vertical axis wind power generator. According to a preferred embodiment of the present invention, each of the sectional vanes includes a frame unit and a plurality of vane units. The frame unit includes a root section for fixedly mounted to an outer periphery of the main shaft of the vertical axis wind power generator, an inner end plate for mounting to a free end of the root section, an outer end plate, an upper frame member connected at two opposite ends to and between upper portions of the inner and the outer end plate, and at least one lower frame member connected at two opposite ends to and between lower portions of the inner and the outer end plate. The upper frame member is provided on one side facing toward the lower frame member with a longitudinally extended upper guide rail, and the lower frame member is provided on one side facing toward the upper frame member with a longitudinally extended lower guide rail corresponding to the upper guide rail. Each of the vane units includes a vane body, which is provided on a top and a bottom with an upper and a lower guide channel, respectively, and is slidably assembled to and between the upper and the lower frame member through engagement of the upper and the lower guide channel with the upper and the lower guide rail, respectively. The number of vane units that are to be assembled to the frame unit is determined depending on the length of the upper and lower frame members and the number of the lower frame members. Therefore, the sectional vane according to the present invention can be varied in length and area according to actual need.

Preferably, there is a plurality of lower frame members being parallelly spaced below the upper frame member. In this case, the lower frame members are respectively provided on each of two opposite sides thereof with a longitudinally extended guide rail. The vane units can be slidably engaged with and guided by the guide rails to thereby be assembled to and between the parallelly spaced lower frame members. Therefore, the sectional vane according to the present invention can be varied in area by providing different numbers of lower frame members and vane units.

According to an embodiment of the vane unit for the sectional vane of the present invention, the vane unit includes a vane body, a first arcuate guide bar, an openwork screen, and a first movable baffle assembly. The vane body has a body portion that defines a rearward recess, and includes a front plate portion, on which a through hole is formed. The first arcuate guide bar is located in the rearward recess, and has a first end and an opposing second end; the second end is fixedly connected to the body portion and the first end is located at a center of the through hole. The openwork screen is fitted in the through hole and connected to the first end of the first arcuate guide bar. The first movable baffle assembly is located in the rearward recess and slidably fitted around the first arcuate guide bar, and is pivotally turnably connected to the front plate portion via a baffle support bar, such that the first movable baffle assembly openably covers the openwork screen from one side adjacent to the rearward recess. When the rearward recess of the vane is located against the wind, the first movable baffle assembly is blown by the wind to cover the openwork screen and accordingly closes the through hole on the front plate portion for the rearward recess of the vane body to effectively intercept the wind. On the other hand, when the rearward recess of the vane is located before the wind, the first movable baffle assembly naturally opens the through hole on the front plate portion to reduce the air resistance to the rotation of the vane. That is, the vane of the present invention with the rearward recess located against the wind can effectively utilize the wind force without being adversely affected by an opposing vane that has a rearward recess located before the wind at the same time. Thus, the main shaft of the wind power generator can be more easily driven by the vanes to rotate.

Preferably, the front plate portion has an outward curved front surface, and an area of the outward curved front surface surrounding the through hole is formed into a bell-shaped sunken portion. The outward curved front surface can advantageously guide air currents to outer sides of the vane body, and the sunken portion can advantageously guide part of the air currents through the through hole to outer sides of the vane body.

Preferably, the openwork screen has a sleeve portion and a screen body connected to and located around the sleeve portion. The sleeve portion is fitted around the first end of the first arcuate guide bar. The screen body is provided with a plurality of openings and is fixedly connected at an outer periphery thereof to an inner peripheral wall of the through hole. Therefore, the openwork screen is fitted in the through hole and supported by the first arcuate guide bar.

Preferably, the first movable baffle assembly includes a first sleeve and a first movable baffle connected to and located around an end of the first sleeve. The first sleeve is slidably fitted around the first arcuate guide bar, and the first movable baffle normally covers the openwork screen from one side adjacent to the rearward recess. Thus, the first movable baffle assembly openably covers the openwork screen and is supported and guided by the first arcuate guide bar to move between an opened position and a closed position to open and cover the openwork screen, respectively.

Preferably, a first buffer spring is provided between the openwork screen and the first movable baffle assembly, and a first and a second magnetic ring having the same polarity are provided on the first buffer spring and the first movable baffle assembly at contact faces thereof to buffer the impact between the first movable baffle assembly and the openwork screen and accordingly, avoid damaged parts and noise caused by such impact.

Preferably, the vane unit further includes a stop assembly, which includes a stop ring fixedly mounted to the first arcuate guide bar near the second end thereof, and a stop spring arranged on the first arcuate guide bar to one side of the stop ring facing toward the first end. The stop ring functions to limit a maximum angle by which the first movable baffle assembly can be pivotally turned open. Therefore, the first movable baffle assembly is protected against damage due to an exceeded open angle caused by an extremely strong wind. The stop spring can buffer the impact between the first movable baffle assembly and the stop ring.

Preferably, the stop assembly further includes a holding device, which is pivotally turnably connected to one lateral side of the stop ring. The holding device includes a control lever and a hook connected to the control lever. And, the first movable baffle assembly is provided at positions corresponding to the control lever and the hook with a push bar and a retaining ring, respectively. When the first movable baffle assembly is blown open by a strong wind and stopped by the stop ring from turning any further, the push bar will strike against the control lever of the holding device at the same time, bringing the hook to engage with the retaining ring. Thus, the first movable baffle assembly is held to the fully opened position, allowing the vane to rotate at a reduced speed to avoid damaged parts of the vane due to undesirable quick rotation of the vane under extremely strong wind.

Preferably, the holding device further includes an outward projected release lever for disengaging the hook from the retaining ring.

Preferably, an electromagnetic valve is provided above the control lever for disengaging the hook from the retaining ring.

According to another embodiment of the vane unit for the present invention, the vane unit includes a vane body, a first arcuate guide bar, an openwork screen, a first movable baffle assembly, and a second movable baffle assembly. The vane body has a body portion that defines a rearward recess and includes a front plate portion, on which a through hole is formed. The first arcuate guide bar is located in the rearward recess, and has a first end and an opposing second end. The second end is fixedly connected to the body portion and the first end is located at a center of the through hole. The openwork screen is fitted in the through hole and connected to the first end of the first arcuate guide bar. The first movable baffle assembly has openings formed thereon and is located in the rearward recess of the vane body behind the openwork screen. The first movable baffle assembly includes a second arcuate guide bar in the form of a sleeve slidably fitted around the first arcuate guide bar, and is connected to the front plate portion of the vane body via a pivot point on a baffle support bar, so that the first movable baffle assembly is turnable about the pivot point to openably cover the openwork screen from one side adjacent to the rearward recess. The second arcuate guide bar has a proximal end and a distal end, and a radially outward extended flange formed around the distal end. The second movable baffle assembly is located in the rearward recess of the vane body behind the first movable baffle assembly, and is slidably fitted around the second arcuate guide bar to openably cover the first movable baffle assembly from one side adjacent to the rearward recess. When the rearward recess of the vane body is located against the wind, the first and the second movable baffle assembly on the vane body are located at a closed position to cover the openwork screen and the through hole, allowing the rearward recess to effectively intercept the wind force; and when the rearward recess of the vane body is located before the wind, the first and the second movable baffle assembly are naturally opened, allowing the wind to quickly move through the through hole to outer sides of the vane body without producing an increased air resistance to the rotating vane body. That is, the vane with the rearward recess located against the wind can effectively utilize the wind force without being adversely affected by an opposing vane that has the rearward recess located before the wind at the same time. Thus, the main shaft of the wind power generator can be more easily driven by the vanes to rotate.

Preferably, a second buffer spring is provided between the first and the second movable baffle assembly to buffer the impact therebetween, so as to avoid damaged parts and noise caused by such impact.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof. For the purpose of easy to understand, elements that are the same in the illustrated preferred embodiments are denoted by the same reference numerals.

Figure 1:
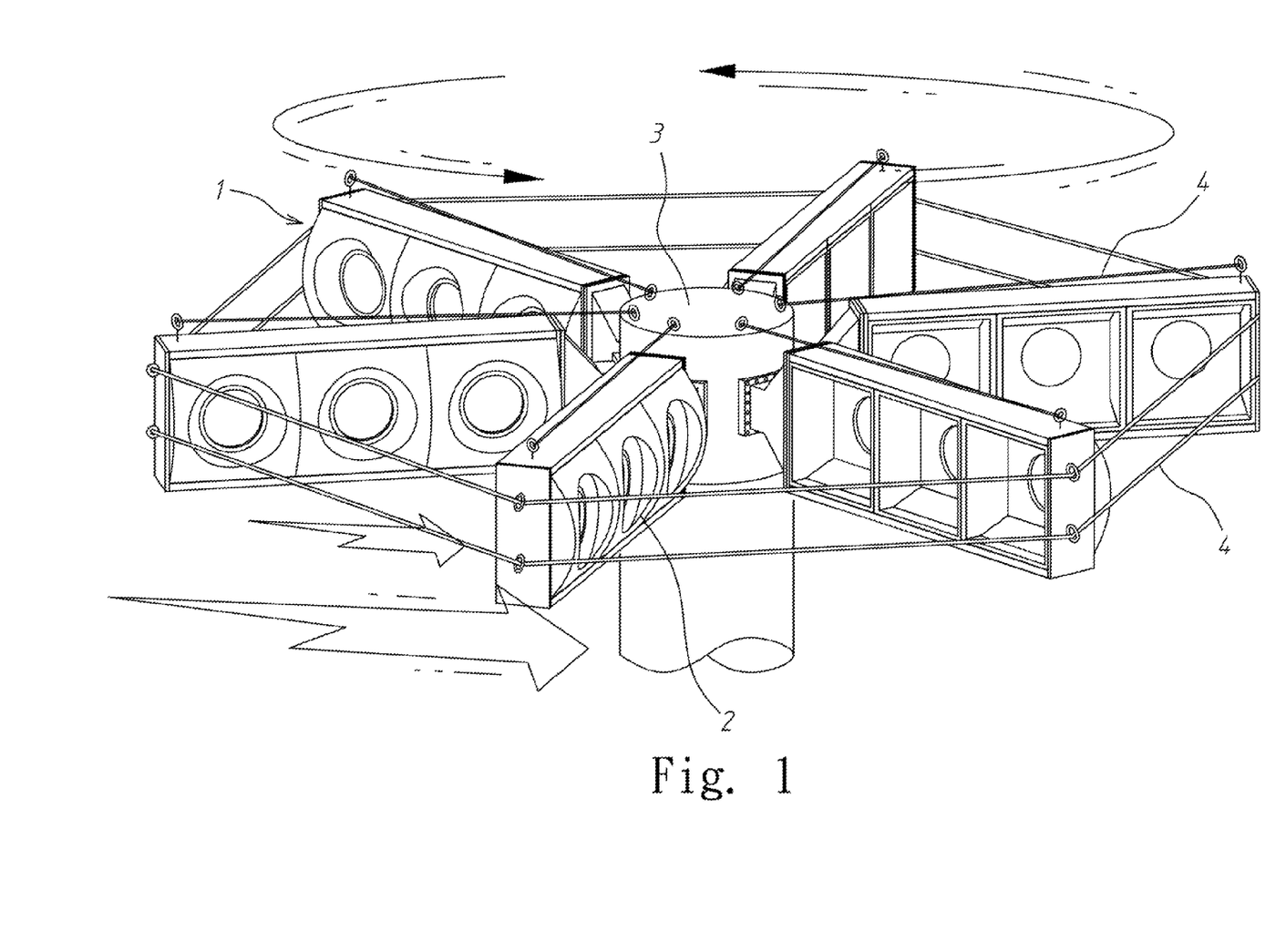
FIG. 1 is a fragmentary perspective view showing a plurality of sectional vanes according to the present invention is mounted around and spaced along a main shaft of a wind power generator.
Figure 2:
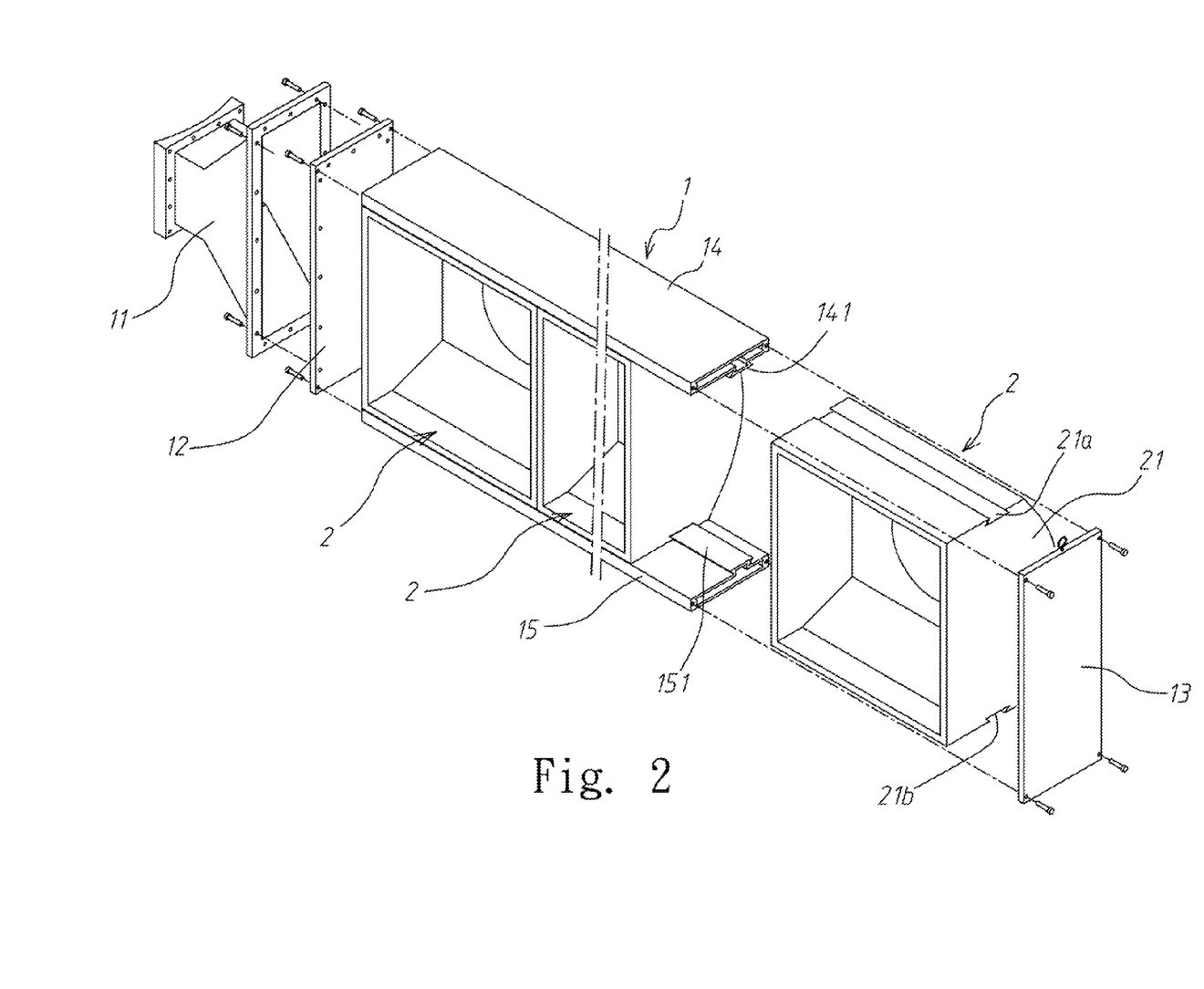
FIG. 2 is an exploded perspective view of a sectional vane according to a first embodiment of the present invention.

Please refer to FIG. 1 that is a fragmentary perspective view showing a plurality of sectional vanes according to the present invention is mounted around and spaced along a main shaft 3 of a wind power generator, and to FIG. 2 that is an exploded perspective view showing one of the sectional vanes of FIG. 1.

As shown, the sectional vane for vertical axis wind power generator according to a first embodiment of the present invention includes a frame unit 1 and a plurality of vane units 2. The frame unit 1 is fixedly mounted to a main shaft 3 of the wind power generator, and the vane units 2 are removably assembled to the frame unit 1.

In practical implementation, the frame unit 1 includes a root section 11, an inner end plate 12, an outer end plate 13, an upper frame member 14, and at least one lower frame member 15. In the embodiment illustrated in FIGS. 1 and 2, there is shown only one lower frame member 15.

The root section 11 is fixedly connected at an end to an outer periphery of the main shaft 3. The inner end plate 12 is connected to a free end of the root section 11. The upper frame member 14 is connected to and between upper portions of the inner end plate 12 and the outer end plate 13. The lower frame member 15 is connected to and between lower portions of the inner end plate 12 and the outer end plate 13. The upper frame member 14 is provided on one side facing toward the lower frame member 15 with a longitudinally extended upper guide rail 141, and the lower frame member 15 is provided on one side facing toward the upper frame member 14 with a longitudinally extended lower guide rail 151 corresponding to the upper guide rail 141. The upper frame member 14 and the lower frame member 15 are spaced from each other by a predetermined distance, which is just large enough for installing the vane units 2 between the upper and the lower frame member 14, 15.

The vane unit 2 includes a vane body 21, which is provided on a top and a bottom with an upper guide channel 21a and a lower guide channel 21b, respectively.

The vane units 2 (three are shown in FIGS. 1 and 2) can be slidably assembled to the frame unit 1 between the upper and the lower frame member 14, 15 through engagement of the upper and the lower guide channel 21a, 21b with the upper guide rail 141 of the upper frame member 14 and the lower guide rail 151 of the lower frame member 15, respectively. Then, the outer end plate 13 is covered onto an outer lateral side of the outermost vane unit 2 to complete the assembly of the vane units 2 to the frame unit 1 and provide a complete sectional vane of the present invention.

In practical implementation, the guide rails 141, 151 can be dovetail slides and the guide channels 21a, 21b can be dovetail grooves to provide increased stability in the engagement of the guide rails 141, 151 with the guide channels 21a, 21b.

With the above arrangements, the sectional vane of the present invention provides the following advantages: (1) parts and components for forming the vane units 2 and the frame unit 1 can be made of an aluminum material through extrusion, allowing the vane units 2 and the frame unit 1 to be mass-produced; (2) the length and size of the sectional vane can be changed simply by changing the length of the upper and lower frame members 14, 15 and the number of the vane units 2, allowing easy and convenient production and assembling of the sectional vane; and (3) any damaged part or component can be separately replaced without the need of changing the whole vane, allowing easy and convenient maintenance of the vane.

The vane unit 2 for the sectional vane of the present invention is provided with a movable baffle structure to close and open a through hole formed on the vane body 21 of the vane unit 2. Please refer to FIGS. 3 to 5, in which the structure of a first embodiment of the vane unit 2 is shown.

Figure 3:
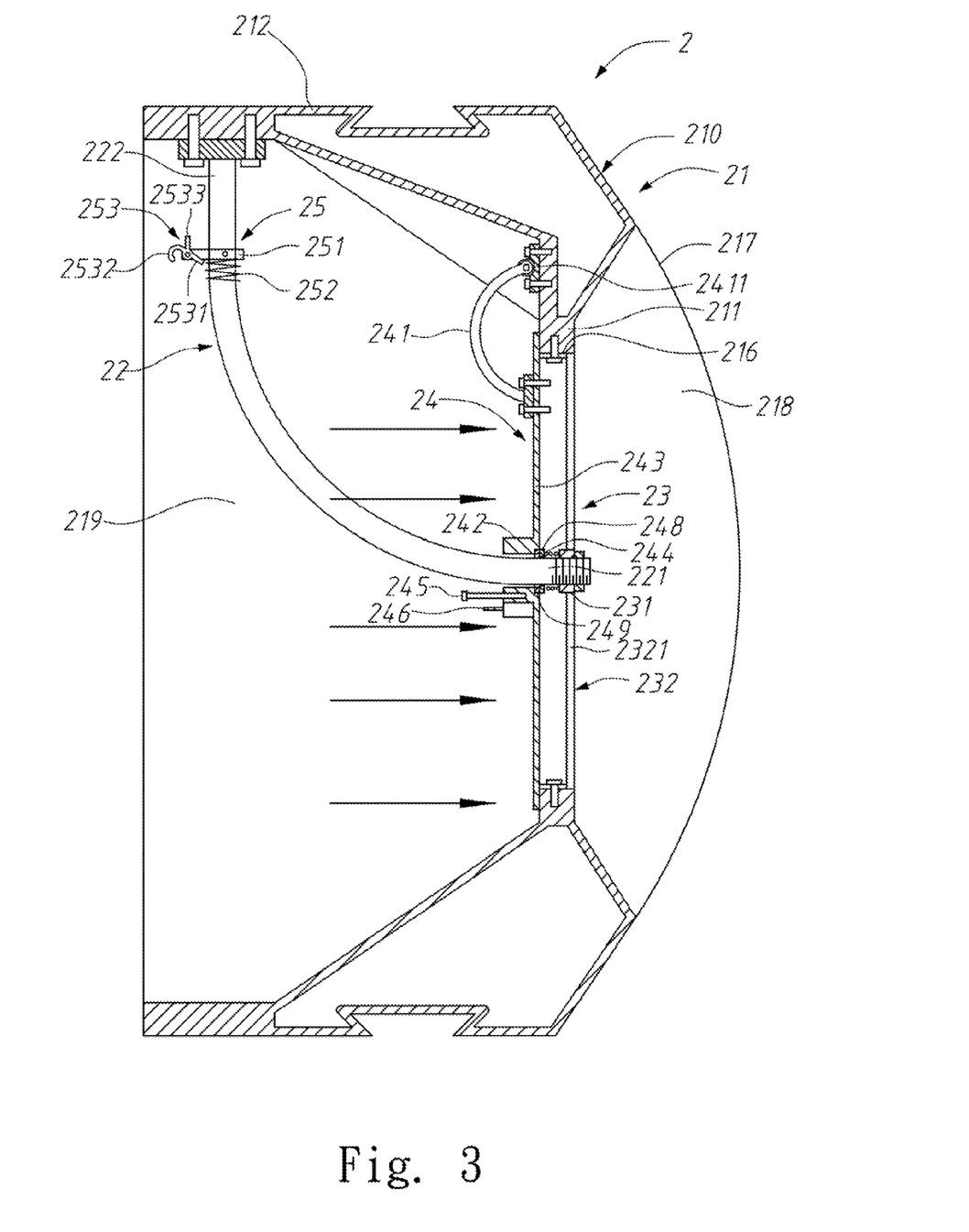
FIG. 3 is a sectioned side view of a first embodiment of a vane unit for the present invention with a first movable baffle assembly thereof at a closed position.

As shown, the vane unit 2 according to the first embodiment thereof includes a vane body 21, a first arcuate guide bar 22, an openwork screen 23, and a first movable baffle assembly 24.

The vane body 21 includes a body portion 210 that defines a rearward recess 219. In practical implementation, the body portion 210 includes a front plate portion 211, an upper plate portion 212 and an opposing lower plate portion 213 extended from an upper and a lower edge of the front plate portion 211, and a left plate portion 214 and an opposing right plate portion 215 extended from a left and a right edge of the front plate portion 211. The rearward recess 219 is formed between the front, the upper, the lower, the left and the right plate portion 211, 212, 213, 214, 215 to effectively intercept the flow of air currents and wind force.

The front plate portion 211 is provided with a through hole 216, and has an outward curved front surface 217 with an area surrounding the through hole 216 formed into a substantially bell-shaped sunken portion 218. That is, the through hole 216 is formed on the front plate portion 211 at a bottom of the sunken portion 218.

The first arcuate guide bar 22 is located in the rearward recess 219, and has a first end 221 and an opposing second end 222. The second end 222 is fixedly connected to a predetermined position on the body portion 210, such as the upper plate portion 212. The first end 221, is located at a center of the through hole 216 on the body portion 210.

The openwork screen 23 is mounted in the through hole 216 on the body portion 210 and connected to the first end 221 of the first arcuate guide bar 22. In practical implementation, the openwork screen 23 includes a sleeve portion 231 and a screen body 232 connected to and located around the sleeve portion 231. The sleeve portion 231 is fitted around the first end 221 of the first arcuate guide bar 22, and the screen body 232 is fixedly connected at an outer periphery thereof to an inner peripheral wall of the through hole 216. On the screen body 232, there is provided a plurality of openings 2321. With the above arrangements, the openwork screen 23 is fitted in the through hole 216.

The first movable baffle assembly 24 is located in the rearward recess 219 behind the openwork screen 23 and slidably fitted around the first arcuate guide bar 22. The first movable baffle assembly 24 is connected to the front plate portion 211 of the vane body 21 via a pivot point 2411 on a baffle support bar 241, so that the first movable baffle assembly 24 is turnable about the pivot point 2411 into the rearward recess 219 or toward the openwork screen 23 to openably close the through hole 216 and accordingly, the openwork screen 23. In practical implementation, the first movable baffle assembly 24 includes a first sleeve 242 and a first movable baffle 243 connected to and located around an end of the first sleeve 242. The first sleeve 242 is slidably fitted around the first arcuate guide bar 22, and the first movable baffle 243 normally covers the openwork screen 23 from one side adjacent to the rearward recess 219. That is, the first arcuate guide bar 22 is not only connected to the openwork screen 23 for supporting the same, but also functions to guide the first movable baffle assembly 24 to an opened position or a closed position while firmly supporting the first movable baffle assembly 24 thereon.

As can be seen from FIG. 3, when the wind blows against the vane body 21 of the vane unit 2 from the side with the rearward recess 219, the first movable baffle assembly 24 is blown toward the openwork screen 23 to thereby close the openings 2321 on the openwork screen 23, allowing the rearward recess 219 of the vane body 21 of the vane unit 2 to effectively intercept the wind for driving the main shaft 3 to rotate.

Figure 4:
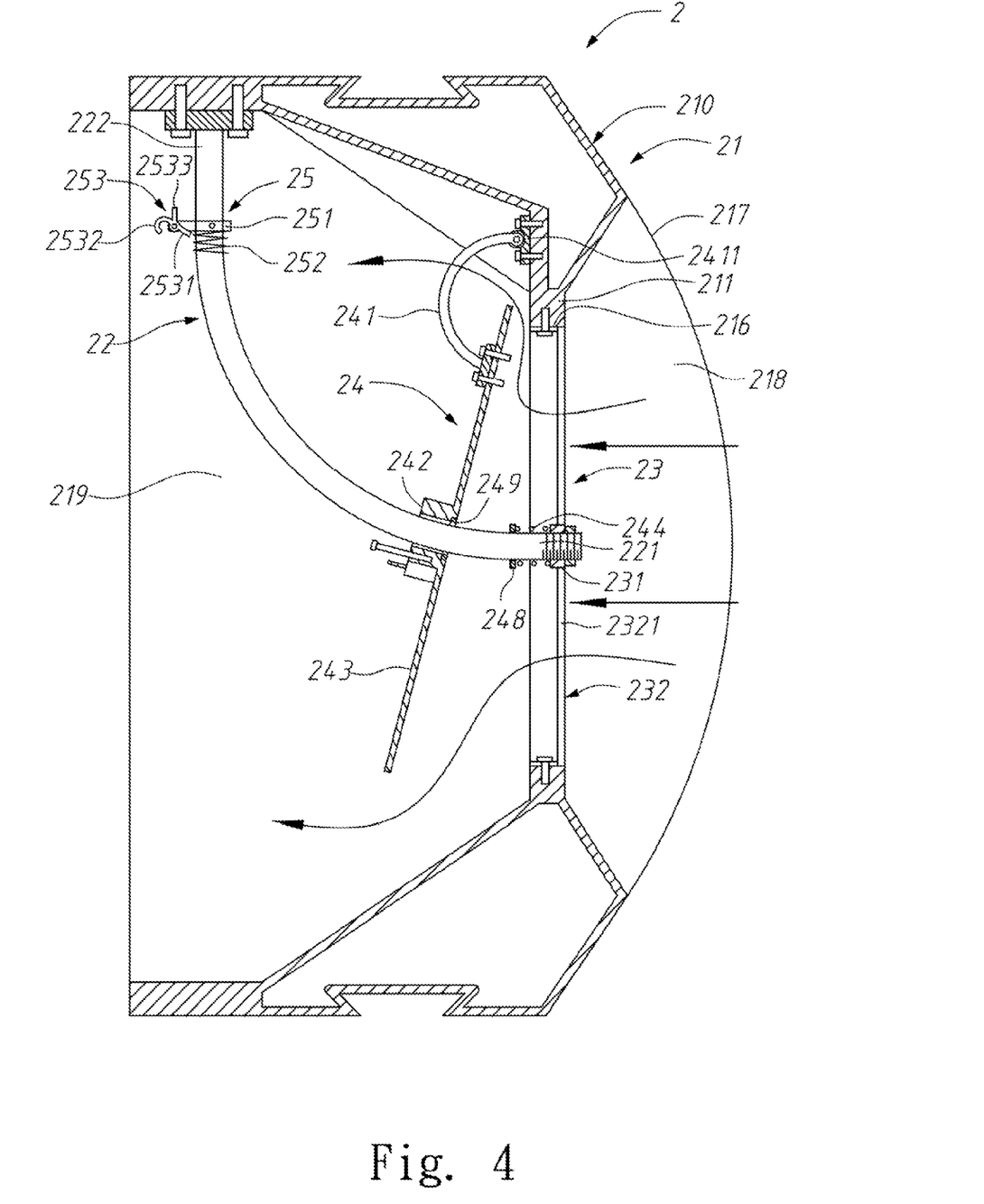
FIG. 4 is a sectioned side view similar to FIG. 3 with the first movable baffle assembly at a partially opened position.

While the wind blows against the rearward recess 219 of the above-mentioned vane unit 2, it also blows against the outward curved front surface 217 of the front plate portion 211 of a diametrically opposing vane unit 2, as shown in FIG. 4. At this point, while some part of the air currents of the wind is guided by the outward curved front surface 217 toward outer sides of the opposing vane unit 2, other part of the air currents of the wind acting on the front plate portion 211 is guided into the sunken portion 218 to pass through the openings 2321 on the openwork screen 23 and blow against the first movable baffle assembly 24, bringing the first movable baffle assembly 24 to turn about the pivot point 2411 of the baffle support bar 241 while being guided by the first arcuate guide bar 22 to move away from the openwork screen 23 to open the through hole 216. At this point, with the through hole 216 on the opposing vane unit 2 in an opened state, the wind is no longer blocked by the opposing vane unit 2 but can pass through the openings 2321 on the openwork screen 23 and be guided to outer sides of the opposing vane unit 2. As a result, the air resistance at the opposing vane unit 2 is reduced.

Thus, according to the first embodiment of the vane unit 2 for the present invention, when the wind force acts on the rearward recess 219 of one of the vane unit 2 on the main shaft 3 of the vertical axis wind power generator, a diametrically opposing vane unit 2 thereof can quickly remove the air resistance at the same time to thereby eliminate any significant obstruction to the wind force by the opposing vane unit 2, allowing the sectional vanes to produce increased push for driving the main shaft 3 of the wind power generator to rotate.

A first buffer spring 244 is provided between the openwork screen 23 and the first movable baffle assembly 24. When the first movable baffle assembly 24 is turned toward the openwork screen 23 to close the same, the first buffer spring 244 functions to buffer the impact of the first movable baffle assembly 24 against the openwork screen 23 and accordingly, avoid damaged parts and noise caused by such impact. Further, a first magnetic ring 248 and a second magnetic ring 249 that have the same polarity are respectively provided on the first buffer spring 244 and the first movable baffle assembly 24 at contact faces thereof, so that magnetic repulsion between the first and the second magnetic ring 248, 249 further buffers the impact between the first movable baffle assembly 24 and the openwork screen 23.

Figure 5:
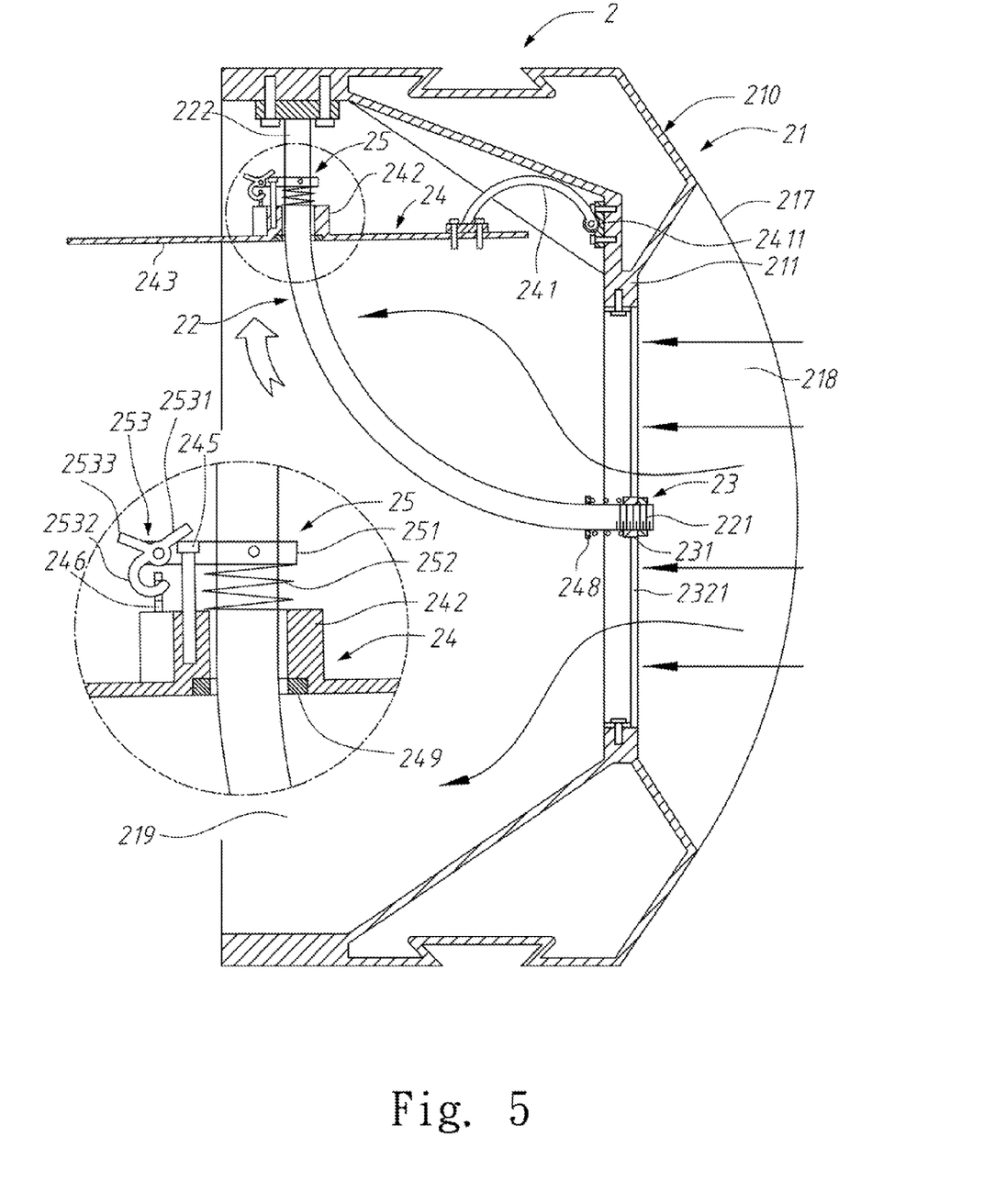
FIG. 5 is a sectioned side view similar to FIG. 4 with the first movable baffle assembly moved to a fully opened position and hooked thereto by a holding device, which is shown in a partially enlarged view.

Please refer to FIGS. 3 to 5, particularly FIG. 5. The first embodiment of the vane unit 2 for the present invention further includes a stop assembly 25, which includes a stop ring 251 and a stop spring 252. The stop ring 251 is fixedly mounted to the first arcuate guide bar 22 near the second end 222, and the stop spring 252 is arranged on the first arcuate guide bar 22 to one side of the stop ring 251 facing toward the first end 221. The stop ring 251 functions to limit a maximum angle by which the first movable baffle assembly 24 can be pivotally turned open. Therefore, the first movable baffle assembly 24 is protected against damage due to an exceeded open angle caused by an extremely strong wind, such as typhoon. The stop spring 252 can buffer the impact between the first movable baffle assembly 24 and the stop ring 251.

The stop assembly 25 further includes a holding device 253, which is pivotally turnably connected to one lateral side of the stop ring 251. The holding device 253 includes a control lever 2531 and a hook 2532 connected to the control lever 2531. And, the first movable baffle assembly 24 is provided at positions corresponding to the control lever 2531 and the hook 2532 with a push bar 245 and a retaining ring 246, respectively. When the first movable baffle assembly 24 is blown open by a strong wind and stopped by the stop ring 251 from turning any further, the push bar 245 will strike against the control lever 2531 of the holding device 253 at the same time, bringing the control lever 2531 to pivotally turn upward and accordingly, bringing the hook 2532 to pivotally turn downward to engage with the retaining ring 246. Thus, the first movable baffle assembly 24 is held to the fully opened position, allowing the sectional vane to rotate at a reduced speed and avoid damaged parts of the sectional vane due to undesirable quick rotation under extremely strong wind.

The holding device 253 also includes an outward projected release lever 2533. When the strong wind is no longer a problem, the release lever 2533 can be manually pulled to disengage the hook 2532 from the retaining ring 246. At this point, the first movable baffle assembly 24 is not bound to the stop assembly 25 but can freely pivotally turn between the fully opened position and the fully closed position in response to different wind directions to open or close the openwork screen 23.

Alternatively, the holding device 253 can be electrically controlled to release the hook 2532 from the retaining ring 246. In this case, an electromagnetic valve 2534 is mounted on the first arcuate guide bar 22 to locate above the control lever 2531. When the strong wind is no longer a problem, the electromagnetic valve 2534 can be electrically controlled to strike the control lever 2531 downward, so that the hook 2532 is brought to turn reversely and thereby disengage from the retaining ring 246.

To ensure stable rotation of the sectional vanes, a steel cable 4 is connected to and between each of the upper frame member 14 and the main shaft 3, and any two adjacent outer end plates 13, as can be seen in FIG. 1.

Figure 6:
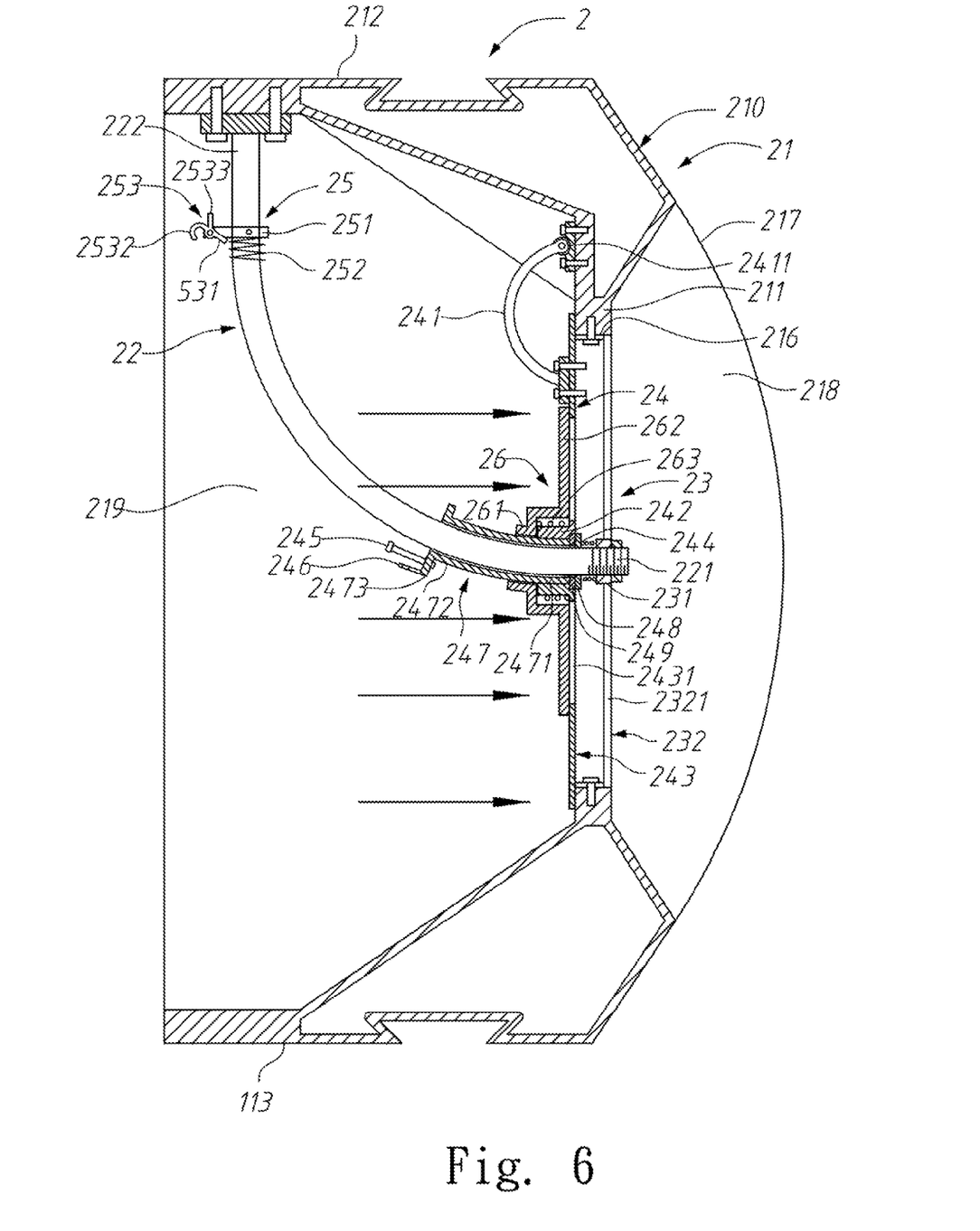
FIG. 6 is a sectioned side view of a second embodiment of the vane unit for the present invention with a first and a second movable baffle assembly thereof at a closed position.
Figure 7:
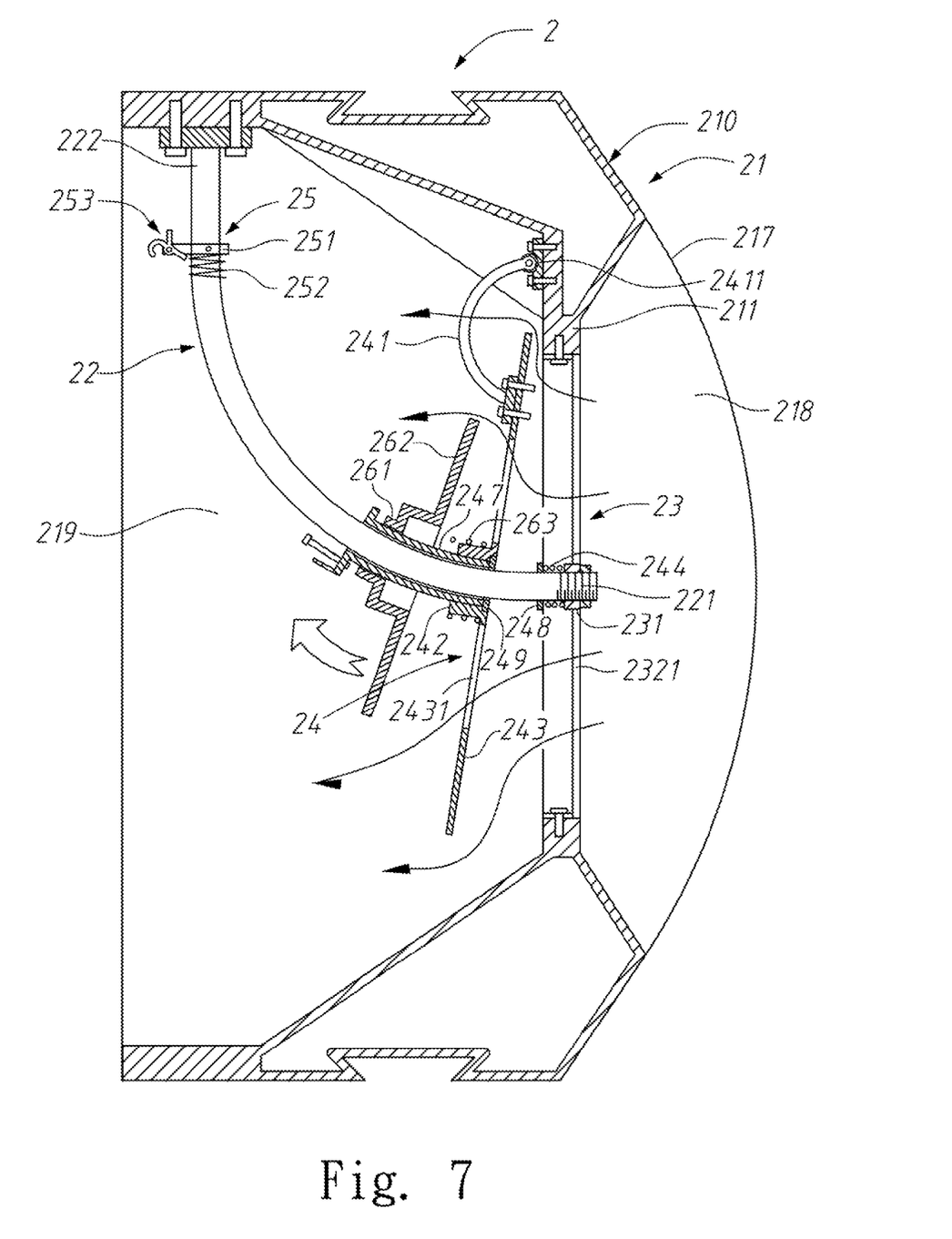
FIG. 7 is a sectioned side view similar to FIG. 6 with the first and the second movable baffle assembly at a partially opened position.
Figure 8:
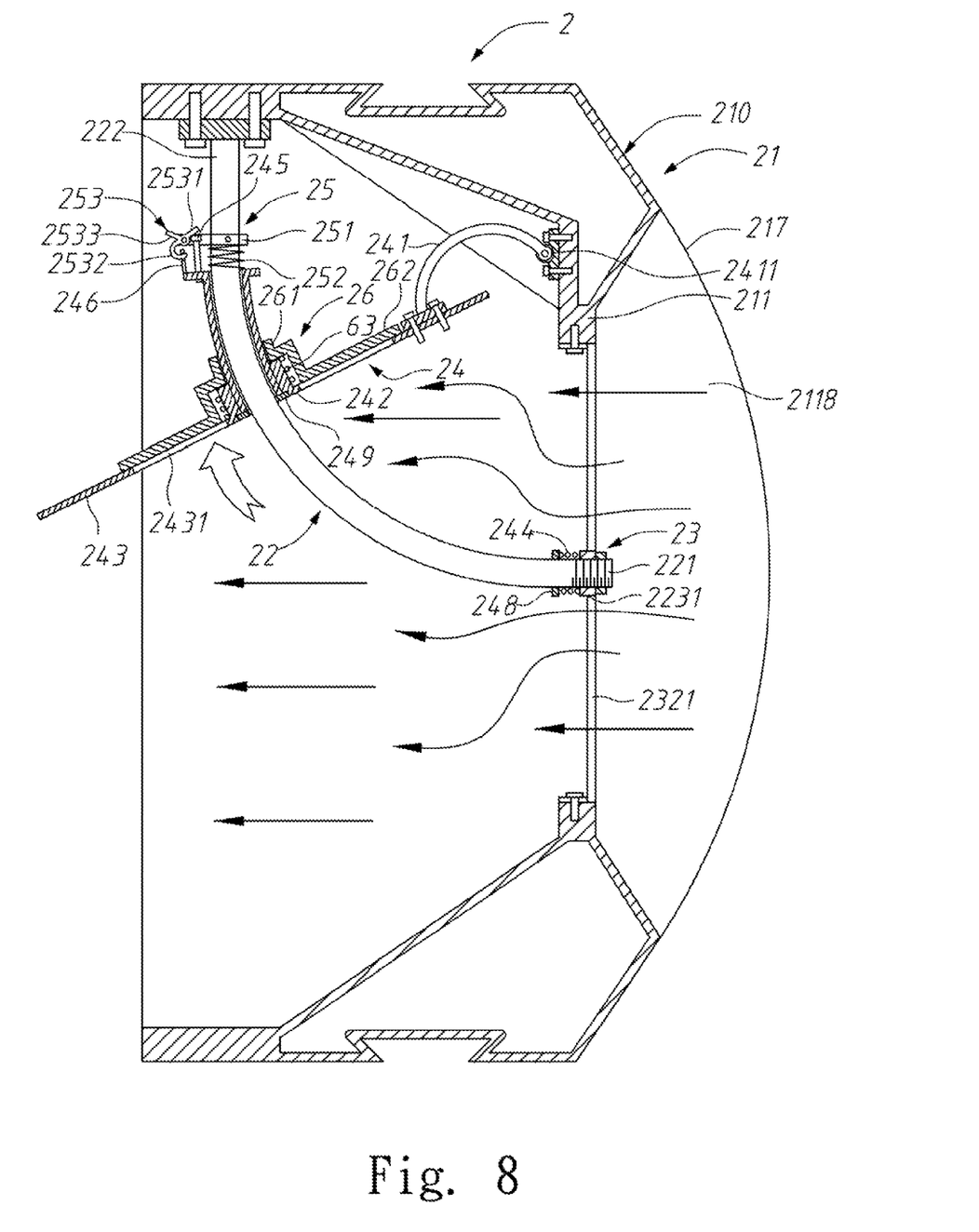
FIG. 8 is a sectioned side view similar to FIG. 7 with the first and the second movable baffle assembly moved to a fully opened position and hooked thereto by a holding device.

FIGS. 6, 7 and 8 are sectioned side views of a second embodiment of the vane unit 2 for the present invention. The second embodiment of the vane unit 2 is generally structurally similar to the first embodiment; except for a second movable baffle assembly 26 for openably covering the first movable baffle assembly 24. That is, the vane unit 2 according to the second embodiment thereof includes two overlapping movable baffle assemblies to reduce the air resistance as quick as possible when the outward curved front surface of the vane unit faces against the wind.

The portions of the vane unit 2 of the second embodiment that are different from the vane unit of the first embodiment will now be described in more details. In the vane unit 2 of the second embodiment, the first movable baffle assembly 24 has openings formed thereon, and is located in the rearward recess 219 of the vane body 21 behind the openwork screen 23. The first movable baffle assembly 24 includes a second arcuate guide bar 247, which is in the form of a sleeve slidably fitted around the first arcuate guide bar 22. As in the vane unit 2 of the first embodiment, the first movable baffle assembly 24 is connected to the front plate portion 211 of the vane body 21 via a pivot point 2411 on a baffle support bar 241, so that the first movable baffle assembly 24 is turnable about the pivot point 2411 into the rearward recess 219 or toward the openwork screen 23 to openably close the through hole 216. As can be seen in FIG. 6, the second arcuate guide bar 247 has a proximal end 2471 and a distal end 2472, and a radially outward extended flange 2473 is formed around the distal end 2472.

In practical implementation, the first movable baffle assembly 24 includes a first sleeve 242 located around the proximal end 2471 of the second arcuate guide bar 247, and a first movable baffle 243 connected to and located around an end of the first sleeve 242. The first movable baffle 243 normally covers the openwork screen 23 from one side adjacent to the rearward recess 219, and is provided with a plurality of openings 2431.

The second movable baffle assembly 26 is located in the rearward recess 219 of the vane body 21 and slidably fitted around the second arcuate guide bar 247. The second movable baffle assembly 26 normally openably covers the first movable baffle assembly 24 from one side adjacent to the rearward recess 219. In practical implementation, the second movable baffle assembly 26 includes a second sleeve 261 and a second movable baffle 262 connected to and located around the second sleeve 261. The second sleeve 261 is slidably fitted around the second arcuate guide bar 247, and the second movable baffle 262 normally closes the openings 2431 on the first movable baffle assembly 24 from one side adjacent to the rearward recess 219.

As shown in FIG. 6, when the rearward recess 219 on the vane unit 2 is located against the wind, the second movable baffle assembly 26 is blown by the wind toward the first movable baffle assembly 24 to close the openings 2431, and the first movable baffle assembly 24 is also blown by the wind toward the openwork screen 23 to close the openings 2321, making the whole vane unit 2 a complete plate without any opening. At this point, the rearward recess 219 can effectively intercept the wind force to thereby drive the main shaft 3 to rotate.

Please refer to FIG. 7. While the wind blows against the rearward recess 219 of the above-mentioned vane unit 2, it also blows against the outward curved front surface 217 of the front plate portion 211 of an opposing vane unit 2 that is located diametrically opposite to the above-mentioned vane unit 2. At this point, while some part of the air currents of the wind is guided by the outward curved front surface 217 toward outer sides of the opposing vane unit 2, other part of the air currents of the wind acting on the front plate portion 211 is guided into the sunken portion 218 to pass through the openings 2321 on the openwork screen 23 and blow against the first movable baffle assembly 24, bringing the first movable baffle assembly 24 to turn about the pivot point 2411 of the baffle support bar 241 while being guided by the first arcuate guide bar 22 to move away from the openwork screen 23 to an opened position. Meanwhile, the wind passes through the openings 2431 on the first movable baffle assembly 24 to act on the second movable baffle assembly 26, bringing the second movable baffle assembly 26 to move away from the first movable baffle assembly 24 while sliding along the second arcuate guide bar 247.

At this point, with the through hole 216 and the first and the second movable baffle assembly 24, 26 on the opposing vane unit 2 in an opened state, the wind is no longer blocked by the opposing vane unit 2 but can pass through the openings 2321 on the openwork screen 23 and the openings 2431 on the first movable baffle assembly 24 to be guided to outer sides of the opposing vane unit 2. As a result, the air resistance at the opposing vane unit 2 is reduced.

A second buffer spring 263 is provided between the first movable baffle assembly 24 and the second movable baffle assembly 26. When the second movable baffle assembly 26 is moved toward the first movable baffle assembly 24 to close the same, the second buffer spring 263 functions to buffer the impact of the second movable baffle assembly 26 against the first movable baffle assembly 24. Therefore, damaged parts and noise caused by such impact can be avoided.

Similarly, a stop assembly 25 is provided on the first arcuate guide bar 22 near the second end 222 thereof. The stop assembly 25 includes a stop ring 251 and a stop spring 252, which provide the same functions as in the first embodiment. And, the stop assembly 25 further includes a holding device 253, which is pivotally turnably connected to one lateral side of the stop ring 251. The holding device 253 includes a control lever 2531 and a hook 2532 connected to the control lever 2531. However, in the second embodiment of the vane unit 2, the push bar 245 and the retaining ring 246 corresponding to the control lever 2531 and the hook 2532, respectively, are provided on the flange 2473 of the second arcuate guide bar 247 of the first movable baffle assembly 24. When the first movable baffle assembly 24 and the second movable baffle assembly 26 are blown open by a strong wind, they can still be held to the stop assembly 25 through engagement of the hook 2532 of the holding device 253 with the retaining ring 246, just the same as in the first embodiment of the vane unit 2.

Similarly, the holding device 253 further includes an outward projected release lever 2533 and an electromagnetic valve 2534 is provided to locate above the control lever 2531, both of which can be used to release the hook 2532 from the retaining ring 246.

With the vane unit of the present invention, when the rearward recess 219 of the vane unit 2 is located against the wind, the movable baffle assembly or assemblies 24, 26 on the vane unit 2 are located at a closed position to close the openwork screen 23 and the through hole 216, allowing the rearward recess 219 to effectively intercept the wind force; and when the rearward recess 219 of the vane unit 2 is located before the wind, the movable baffle assembly or assemblies 24, 26 are naturally moved to an opened position, allowing the wind to quickly move through the through hole 216 on the vane unit 2 to outer sides of the vane unit 2 without producing an increased air resistance to the rotating vane. Further, since the movable baffle assemblies 24, 26 are supported and guided by the arcuate guide bars 22, 247 while they are blown to the closed position or the opened position, the movable baffle assemblies 24, 26 can maintain firm structure and stable operation. Moreover, with the stop assembly 25, the sectional vane can be protected against exceeded turning angle under strong wind, and accordingly, the wind power generator is protected against damage possibly caused by the excessively turned vanes.

Figure 9:
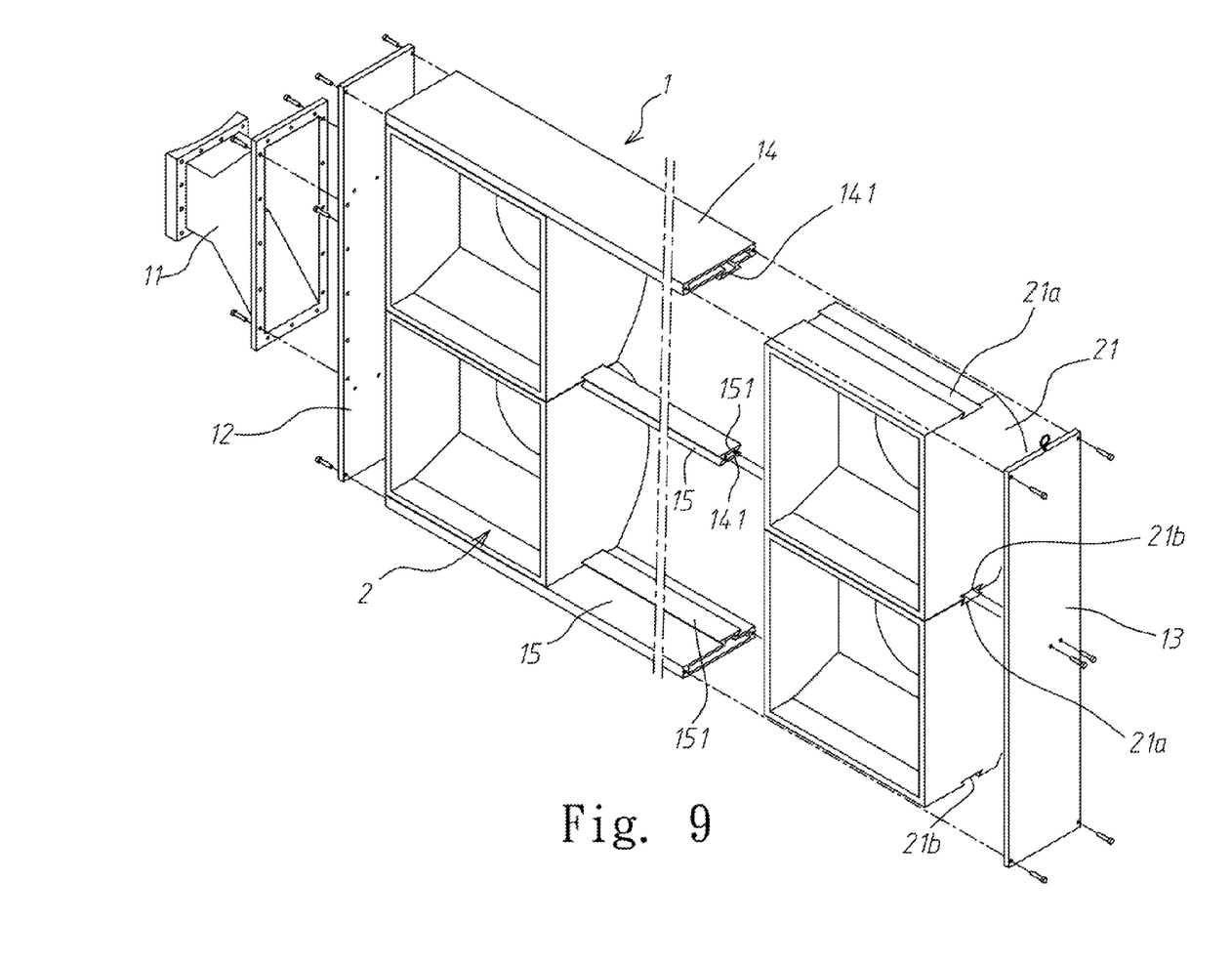
FIG. 9 is an exploded perspective view of a sectional vane according to a second embodiment of the present invention, in which two lower frame members are included in one frame unit of the sectional vane.
Figure 10:
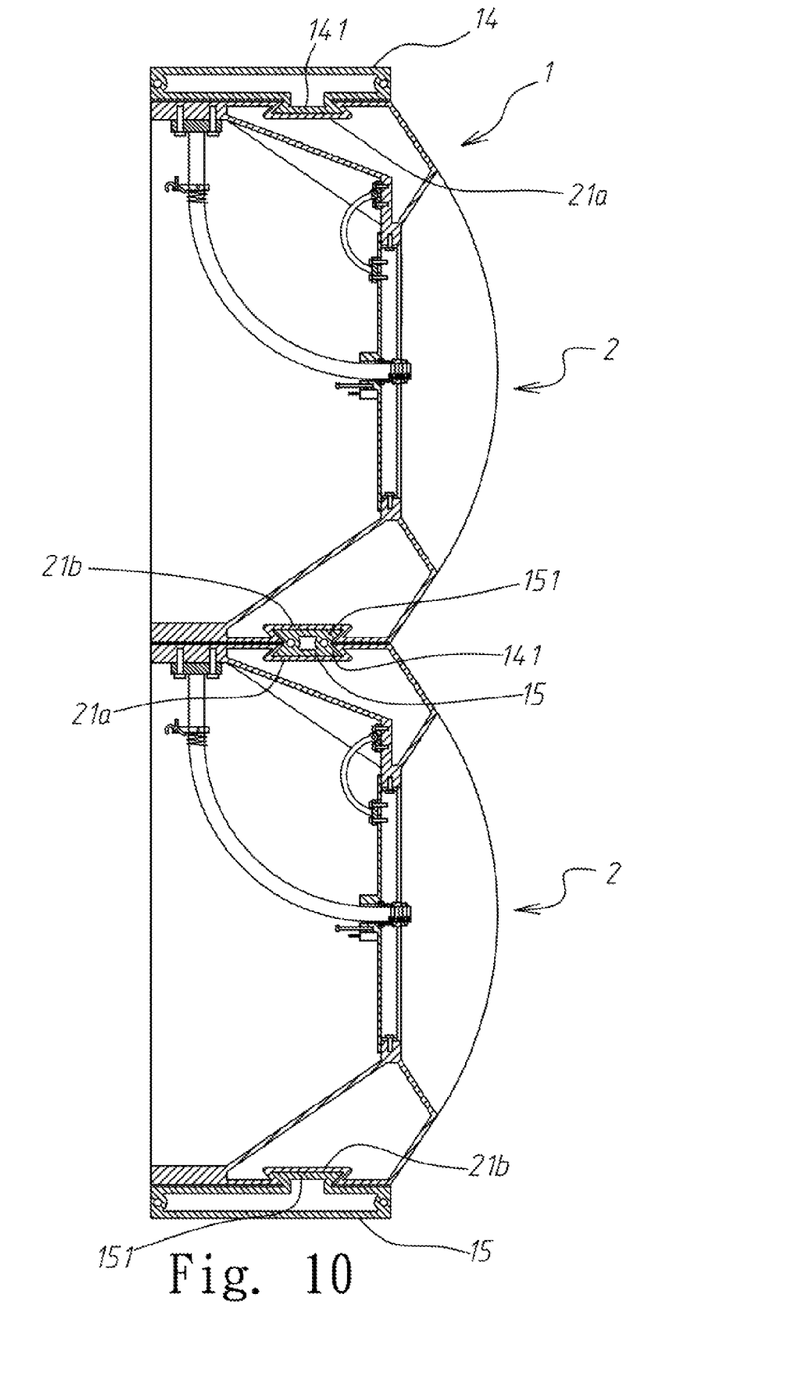
FIG. 10 is a sectioned side view of FIG. 9.

It is noted the lower frame member 15 is not limited to one in number. Instead, the sectional vane according to the present invention can have a plurality of lower frame members 15 being parallelly spaced below the upper frame member 14. In a second embodiment of the present invention as shown in FIGS. 9 and 10, there are two lower frame members 15 parallelly spaced below the upper frame member 14. In this case, a part of the lower frame members 15 that is located between the upper frame member 14 and the lowest one of the lower frame members 15 are respectively provided on an upper side thereof with a longitudinally extended lower guide rail 151 and on a lower side thereof with a longitudinally extended upper guide rail 141. Thus, a plurality of vane units 2 can be assembled to the frame unit 1 between the upper frame member 14 and the lower frame member 15 directly below the upper frame member 14, as well as between any two adjacent lower frame members 15 through engagement of the upper and the lower guide channels 21a, 21b with corresponding upper guide rails 141 and lower guide rails 151, respectively. Thus, the sectional vane according to the present invention can be varied in height and in area by providing different numbers of lower frame members 15 and vane units 2, and accordingly, has very good applicability.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A sectional vane for vertical axis wind power generator, a plurality of the sectional vanes being mounted around and spaced along a main shaft of the wind power generator, and each of the sectional vanes comprising:
    a frame unit including:
        a root section being fixedly mounted to an outer periphery of the main shaft;
        an inner end plate for mounting to a free end of the root section;
        an outer end plate;
        an upper frame member being connected at two opposite ends to and between upper portions of the inner and the outer end plate, and
        at least one lower frame member being connected at two opposite ends to and between lower portions of the inner and the outer end plates;
        the upper frame member being provided on one side facing toward the lower frame member with a longitudinally extended upper guide rail, and the lower frame member being provided on one side facing toward the upper frame member with a longitudinally extended lower guide rail corresponding to the upper guide rail; and
    a plurality of vane units, each of which includes a vane body; the vane body being provided on a top and a bottom with an upper and a lower guide channel, respectively, and being slidably assembled to and between the upper and the lower frame member through engagement of the upper and the lower guide channel with the upper and the lower guide rail, respectively.

2. The sectional vane for vertical axis wind power generator as claimed in claim 1, wherein the lower frame member is more than one in number; the lower frame members being parallelly spaced below the upper frame member, and a part of the lower frame members that are located between the upper frame member and a lowest one of the lower frame members being respectively provided on an upper side thereof with a longitudinally extended lower guide rail and on a lower side thereof with a longitudinally extended upper guide rail, such that the vane units are assembled to the frame unit between the upper frame member and the lower frame member directly below the upper frame member, as well as between any two adjacent lower frame members through engagement of the upper and the lower guide channels with corresponding upper and lower guide rails, respectively.

3. The sectional vane for vertical axis wind power generator as claimed in claim 2, wherein the vane unit includes:
    the vane body, which has a body portion defining a rearward recess; and the body portion including a front plate portion, on which a through hole is formed;
    a first arcuate guide bar being located in the rearward recess, and having a first end and an opposing second end; the second end being fixedly connected to the body portion, and the first end being located at a center of the through hole;
    an openwork screen being fitted in the through hole and connected to the first end of the first arcuate guide bar; and
    a first movable baffle assembly being located in the rearward recess and slidably fitted around the first arcuate guide bar; the first movable baffle assembly being pivotally turnably connected to the front plate portion via a baffle support bar, such that the first movable baffle assembly openably covers the openwork screen from one side adjacent to the rearward recess.

4. The sectional vane for vertical axis wind power generator as claimed in claim 3, wherein the front plate portion has an outward curved front surface, and an area of the outward curved front surface surrounding the through hole is formed into a bell-shaped sunken portion.

5. The sectional vane for vertical axis wind power generator as claimed in claim 4, wherein the openwork screen includes a sleeve portion and a screen body connected to and located around the sleeve portion; the sleeve portion being fitted around the first end of the first arcuate guide bar, and the screen body being fixedly connected at an outer periphery thereof to an inner peripheral wall of the through hole; and the screen body having a plurality of openings formed thereon.

6. The sectional vane for vertical axis wind power generator as claimed in claim 5, wherein the first movable baffle assembly includes a first sleeve and a first movable baffle connected to and located around the first sleeve; the first sleeve being slidably fitted around the first arcuate guide bar, and the first movable baffle normally covering the openwork screen from one side adjacent to the rearward recess.

7. The sectional vane for vertical axis wind power generator as claimed in claim 6, wherein the openwork screen and the first movable baffle assembly have a first buffer spring provided therebetween, and a first and a second magnetic ring having the same polarity are respectively provided on the first buffer spring and the first movable baffle assembly at contact faces thereof.

8. The sectional vane for vertical axis wind power generator as claimed in claim 3, wherein the vane unit further includes a stop assembly, which includes a stop ring fixedly connected to the first arcuate guide bar near the second end thereof and a stop spring arranged on the first arcuate guide bar to one side of the stop ring facing toward the first end of the first arcuate guide bar.

9. The sectional vane for vertical axis wind power generator as claimed in claim 8, wherein the stop assembly further includes a holding device being pivotally turnably connected to a lateral side of the stop ring, and the holding device including a control lever and a hook connected to the control lever; and wherein the first movable baffle assembly is provided at positions corresponding to the control lever and the hook with a push bar and a retaining ring, respectively.

10. The sectional vane for vertical axis wind power generator as claimed in claim 9, wherein the holding device further includes an outward projected release lever connected to the control lever and the hook.

11. The sectional vane for vertical axis wind power generator as claimed in claim 9, further comprising an electromagnetic valve located above the control lever.

12. The sectional vane for vertical axis wind power generator as claimed in claim 2, wherein the vane unit includes:
the vane body, which has a body portion that defines a rearward recess; and the body portion including a front plate portion, on which a through hole is formed;
a first arcuate guide bar being located in the rearward recess, and having a first end and an opposing second end; the second end being fixedly connected to the body portion and the first end being located at a center of the through hole;
an openwork screen being fitted in the through hole and connected to the first end of the first arcuate guide bar;
a first movable baffle assembly having openings formed thereon and being located in the rearward recess of the vane body behind the openwork screen; the first movable baffle assembly including a second arcuate guide bar in the form of a sleeve slidably fitted around the first arcuate guide bar, and being pivotally turnably connected to the front plate portion of the vane body via a baffle support bar, such that the first movable baffle assembly openably covers the openwork screen from one side adjacent to the rearward recess; and the second arcuate guide bar having a proximal end and a distal end, and a radially outward extended flange formed around the distal end; and
a second movable baffle assembly being located in the rearward recess of the vane body behind the first movable baffle assembly; and the second movable baffle assembly being slidably fitted around the second arcuate guide bar to openably cover the first movable baffle assembly from one side adjacent to the rearward recess.

13. The sectional vane for vertical axis wind power generator as claimed in claim 12, wherein the front plate portion has an outward curved front surface, and an area of the outward curved front surface surrounding the through hole is formed into a bell-shaped sunken portion.

14. The sectional vane for vertical axis wind power generator as claimed in claim 13, wherein the openwork screen includes a sleeve portion and a screen body connected to and located around the sleeve portion; the sleeve portion being fitted around the first end of the first arcuate guide bar, and the screen body being fixedly connected at an outer periphery thereof to an inner peripheral wall of the through hole; and the screen body having a plurality of openings formed thereon.

15. The sectional vane for vertical axis wind power generator as claimed in claim 14, wherein the first movable baffle assembly includes a first sleeve and a first movable baffle connected to and located around the first sleeve; the first sleeve being fitted around the proximal end of the second arcuate guide bar, and the first movable baffle having a plurality of openings formed thereon.

16. The sectional vane for vertical axis wind power generator as claimed in claim 15, wherein the second movable baffle assembly includes a second sleeve and a second movable baffle connected to and located around the second sleeve; the second sleeve being slidably fitted around the second arcuate guide bar, and the second movable baffle normally covering the openings on the first movable baffle from one side adjacent to the rearward recess.

17. The sectional vane for vertical axis wind power generator as claimed in claim 16, wherein the openwork screen and the first movable baffle assembly have a first buffer spring provided therebetween, and a first and a second magnetic ring having the same polarity are respectively provided on the first buffer spring and the first movable baffle assembly at contact faces thereof.

18. The sectional vane for vertical axis wind power generator as claimed in claim 17, wherein the first movable baffle assembly and the second movable baffle assembly have a second buffer spring provided therebetween.

19. The sectional vane for vertical axis wind power generator as claimed in claim 12, wherein the vane unit further includes a stop assembly, which includes a stop ring fixedly connected to the first arcuate guide bar near the second end thereof and a stop spring arranged on the first arcuate guide bar to one side of the stop ring facing toward the first end of the first arcuate guide bar.

20. The sectional vane for vertical axis wind power generator as claimed in claim 19, wherein the stop assembly further includes a holding device being pivotally turnably connected to a lateral side of the stop ring and including a control lever and a hook connected to the control lever; and wherein the second arcuate guide bar is provided on the flange at positions corresponding to the control lever and the hook with a push bar and a retaining ring, respectively.

21. The sectional vane for vertical axis wind power generator as claimed in claim 20, wherein the holding device further includes an outward projected release lever connected to the control lever and the hook.

22. The sectional vane for vertical axis wind power generator as claimed in claim 20, further comprising an electromagnetic valve located above the control lever.

* * * * *